(12) United States Patent
Naderiparizi et al.

(10) Patent No.: US 11,410,014 B2
(45) Date of Patent: Aug. 9, 2022

(54) CUSTOMIZABLE CHIP FOR AI APPLICATIONS

(71) Applicant: XNOR.ai, Inc., Seattle, WA (US)

(72) Inventors: Saman Naderiparizi, Seattle, WA (US); Mohammad Rastegari, Bothell, WA (US); Sayyed Karen Khatamifard, Seattle, WA (US)

(73) Assignee: Apple Inc., Cupertino, CA (US)

( * ) Notice: Subject to any disclaimer, the term of this patent is extended or adjusted under 35 U.S.C. 154(b) by 786 days.

(21) Appl. No.: 16/272,997

(22) Filed: Feb. 11, 2019

(65) Prior Publication Data

US 2020/0257955 A1 Aug. 13, 2020

(51) Int. Cl.
*G06N 3/02* (2006.01)
*G06F 3/06* (2006.01)
*G06N 3/04* (2006.01)
*G06N 3/063* (2006.01)

(52) U.S. Cl.
CPC ............. *G06N 3/02* (2013.01); *G06F 3/0604* (2013.01); *G06F 3/0676* (2013.01); *G06F 3/0677* (2013.01); *G06N 3/0454* (2013.01); *G06N 3/063* (2013.01)

(58) Field of Classification Search
CPC ............ G06N 3/02; G06N 3/06; G06N 3/063; G06N 3/0454; G06F 3/0604; G06F 3/0655; G06F 3/0656; G06F 3/0676; G06F 3/0677; G06F 3/0679; G06F 3/0688
See application file for complete search history.

(56) References Cited

U.S. PATENT DOCUMENTS

| 9,756,570 | B1 | 9/2017 | Ramachandra |
| 2015/0055608 | A1* | 2/2015 | Egner ............... H04W 4/025 370/329 |
| 2016/0062993 | A1* | 3/2016 | Lee .................. G06K 9/6282 707/737 |
| 2017/0103298 | A1 | 4/2017 | Ling et al. |
| 2020/0008299 | A1* | 1/2020 | Tran .................. H05K 1/189 |

FOREIGN PATENT DOCUMENTS

| DE | 102017205713 | 10/2018 |
| WO | WO 2017/079052 | 5/2017 |

OTHER PUBLICATIONS

International Search Report and Written Opinion dated May 27, 2020: from PCT/US2020/017755, 16 pages.

* cited by examiner

*Primary Examiner* — Shane D Woolwine
(74) *Attorney, Agent, or Firm* — BakerHostetler

(57) ABSTRACT

In one embodiment, a computing device includes an input sensor providing an input data; a programmable logic device (PLD) implementing a convolutional neural network (CNN), wherein: each compute block of the PLD corresponds to one of a multiple of convolutional layers of the CNN, each compute block of the PLD is placed in proximity to at least two memory blocks, a first one of the memory blocks serves as a buffer for the corresponding layer of the CNN, and a second one of the memory blocks stores model-specific parameters for the corresponding layer of the CNN.

21 Claims, 4 Drawing Sheets

CUSTOMIZABLE CHIP FOR AI APPLICATIONS

TECHNICAL FIELD

This disclosure generally relates to a neural network implemented as a customized integrated circuit.

BACKGROUND

Object detection and identification/classification are important aspects of many systems. These functions are based on the processing and interpretation of images and are used in many applications and settings involving image, object, and pattern recognition, typically as part of a decision process. Example applications include security, access control, identification/authentication, machine vision, artificial intelligence, engineering, manufacturing, robotics, systems control, autonomous vehicles, and other situations involving some form of object or pattern recognition, object detection, or automated decision-making based on an image.

A neural network is a system of interconnected artificial "neurons" that exchange messages between each other. The connections have numeric weights that are tuned during the training process, so that a properly trained network will respond correctly when presented with an image or pattern to recognize. The network consists of multiple layers of feature-detecting "neurons". Each layer has many neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger function (for example, using a sigmoid response function). Deep neural networks (DNN) have shown significant improvements in several application domains including computer vision and speech recognition. In computer vision, a particular type of DNN, known as a Convolutional Neural Network (CNN), has demonstrated state-of-the-art results in object recognition and detection. A CNN is a special case of the neural network described above. A CNN consists of one or more convolutional layers, often with a subsampling layer, which are followed by one or more fully connected layers, as in a standard neural network.

FIG. 1 is a diagram illustrating operations performed by layers of an example CNN 100, showing a plurality of convolution operations 102, a plurality of sub-sampling operations 104, and a full connection stage 106 leading to the production of output 108. As shown in FIG. 1, input data (such as a digitized representation of an image) is provided to the first stage 110, where the input data is processed by an operation of convolutions 102 and subsampling 104. The output of the first stage 110 is provided to the second stage 120, where the input data that was processed by the first stage 110 is processed by an operation of additional convolutions 102 and sub-sampling 104. Then, the output of the second stage is provided to a classifier 130 (e.g., a fully connected layer), where the data that was processed by the second stage is processed into output 108.

In CNNs, the weights of the convolutional layer used for feature extraction, as well as the fully connected layer used for classification, are determined during a training process. The improved network structures of CNNs lead to savings in memory requirements and computation complexity requirements and, at the same time, give better performance for applications where the input has local correlation (e.g., images and speech).

By stacking multiple and different layers in a CNN, complex architectures are built for classification problems. Four types of layers are most common: convolution layers, pooling/subsampling layers, non-linear layers, and fully connected layers. The convolution operation extracts different features of the input. The first convolution layer extracts low-level features such as edges, lines, and corners; higher-level layers extract higher-level features. The pooling/sub-sampling layer operates to reduce the resolution of the features and makes the features more robust against noise and distortion. There are two ways to do pooling: max pooling and average pooling. Neural networks in general (and CNNs in particular) rely on a non-linear "trigger" function to signal distinct identification of likely features on each hidden layer. CNNs may use a variety of specific functions, such as rectified linear units (ReLUs) and continuous trigger (non-linear) functions, to efficiently implement this non-linear triggering function. Fully connected layers are often used as the final layers of a CNN. These layers mathematically sum a weighting of the previous layer of features, indicating the precise mix of factors to determine a specific target output result. In case of a fully connected layer, all of the elements of all the features of the previous layer are used in the calculation of each element of each output feature.

In addition to recent progress in the area of object recognition, advancements have been made in virtual reality, augmented reality, and "smart" wearable devices. These trends suggest that there is a market demand and need for implementing state-of-the-art image processing and object recognition in smart portable devices. However, conventional CNN-based recognition systems typically require relatively large amounts of memory and computational power to implement because, for example, they typically require a large number of floating-point calculations. Such CNN-based systems can be implemented on small devices based on a central processing unit (CPU) or a graphics processing unit (GPU) such as cell/smart phones, tablets, smart cameras, and other embedded electronic devices. However, due to inevitable relatively high-power consumption, these devices should be constantly plugged to a power source (which reduces system's deployability) or run on a rechargeable battery (which increases maintenance costs significantly). Our proposal, on the other hand, reduces power consumption of system by orders of magnitude, which enables such devices to run only using ambient power sources such as a small solar cell. Embodiments of the invention are directed toward solving these and other problems individually and collectively.

A programmable logic device (PLD) is an electronic component used to build reconfigurable digital circuits. Logic devices can be divided into two categories: fixed logic devices and PLDs. The primary difference between fixed logic devices and PLDs is reconfigurability. Once fixed logic devices are manufactured, its circuit is permanently configured. This means that fixed logic devices can only perform a function or set of functions according to how the devices were manufactured. In contrast, PLDs are manufactured to be reconfigurable to allow wide range of logic capabilities, characteristics, speed and voltage characteristics.

Some of the first widely used PLDs were called programmable logic array (PLA), programmable array logic (PAL), and generic array logic (GAL). Then, through continuous development in the field, PLDs evolved into what is now known as a complex programmable logic device (CPLD) and field programmable gate array (FPGA).

An FPGA is an integrated circuit designed to be configured by a customer or a designer after manufacturing—hence the term "field-programmable". The FPGA configuration is generally specified using a hardware description language (HDL), similar to that used for an application-specific integrated circuit (ASIC). Circuit diagrams were previously used to specify the configuration, but this is increasingly rare due to the advent of electronic design automation tools.

FPGAs contain an array of programmable logic blocks, and a hierarchy of reconfigurable interconnects that allow the blocks to be "wired together", like many logic gates that can be inter-wired in different configurations. Logic blocks can be configured to perform complex combinational functions, or merely simple logic gates like AND and XOR. In most FPGAs, logic blocks also include memory elements, which may be simple flip-flops or more complete blocks of memory. Many FPGAs can be reprogrammed to implement different logic functions, allowing flexible reconfigurable computing as performed in computer software.

An application-specific integrated circuit (ASIC) is a dedicated-purpose integrated circuit designed to a particular function. ASICs are typically smaller in form factor and more compact in circuit design than general purpose integrated circuits. Modern ASICs often include entire microprocessors, memory blocks including ROM, RAM, EEPROM, flash memory and other large building blocks. Such an ASIC is often termed a SoC (system-on-chip). Designers of digital ASICs often use an HDL, such as Verilog or VHDL, to describe the functionality of ASICs when designing the functionality of the ASIC.

SUMMARY OF PARTICULAR EMBODIMENTS

Embodiments of the invention are directed to systems, apparatuses, and methods related to a CNN-based recognition engine implemented on a PLD or ASIC. CNNs are traditionally known to be extremely power-hungry for their intensive computations. However, this disclosure contemplates a power efficient CNN implemented on a PLD (e.g., a FPGA) or ASIC that may reduce average power consumptions by up to approximately a factor of 100 compared to CNNs implemented on a central processing unit (CPU) or a graphics processing unit (GPU). This reduction may be attributed to several features, including, for example, parallel computation of CNN layers, dedicated on-chip memory blocks attached in proximity to compute blocks, and restructuring of model parameters within memory blocks based on near-memory architecture. By using a PLD or ASIC to implement a CNN in hardware, a single type of device can be programmed with a multiplicity of differently trained models; if using a re-programmable PLD (e.g., FPGA), one may re-program the same device with the model and/or the model architecture.

In particular embodiments, a computing device may comprise an input sensor providing an input data, a PLD OR ASIC implementing a CNN, wherein: each of a plurality of logical units of the PLD OR ASIC corresponds to one of a plurality of convolutional layers of the CNN, each logical unit includes a compute block of the PLD placed in proximity to at least two memory blocks, wherein a first one of the memory blocks serves as a buffer for the corresponding layer of the CNN, and a second one of the memory blocks stores model-specific parameters for the corresponding layer of the CNN.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a device, a system, a method, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Embodiments of the invention are directed to systems, apparatuses, and methods related to a CNN implemented on a PLD.

Figure 1:
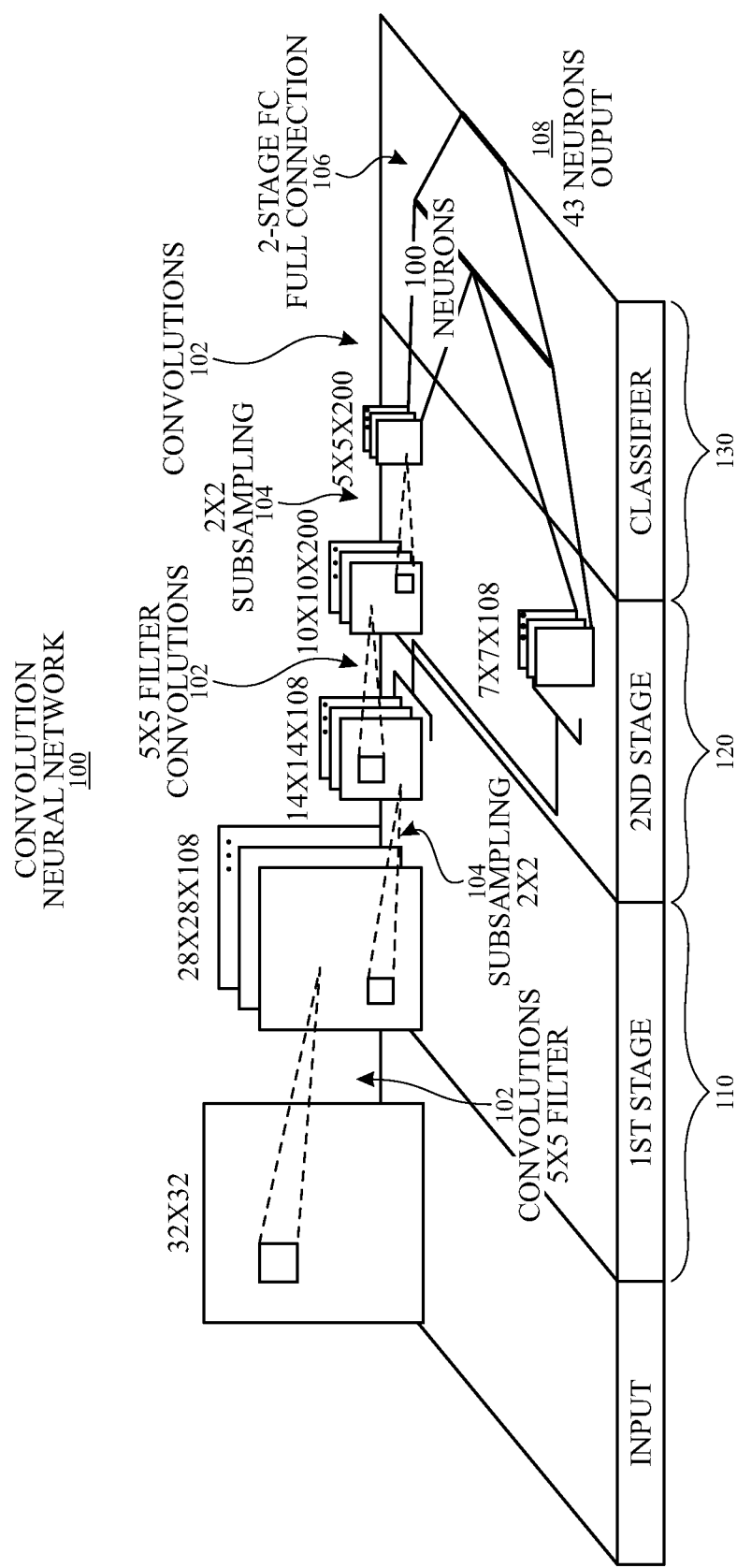
FIG. 1 illustrates elements, layers, and stages of a conventional CNN, showing a plurality of convolutions 102 and a plurality of sub-sampling 104 leading up to the production of output 108.
Figure 2:
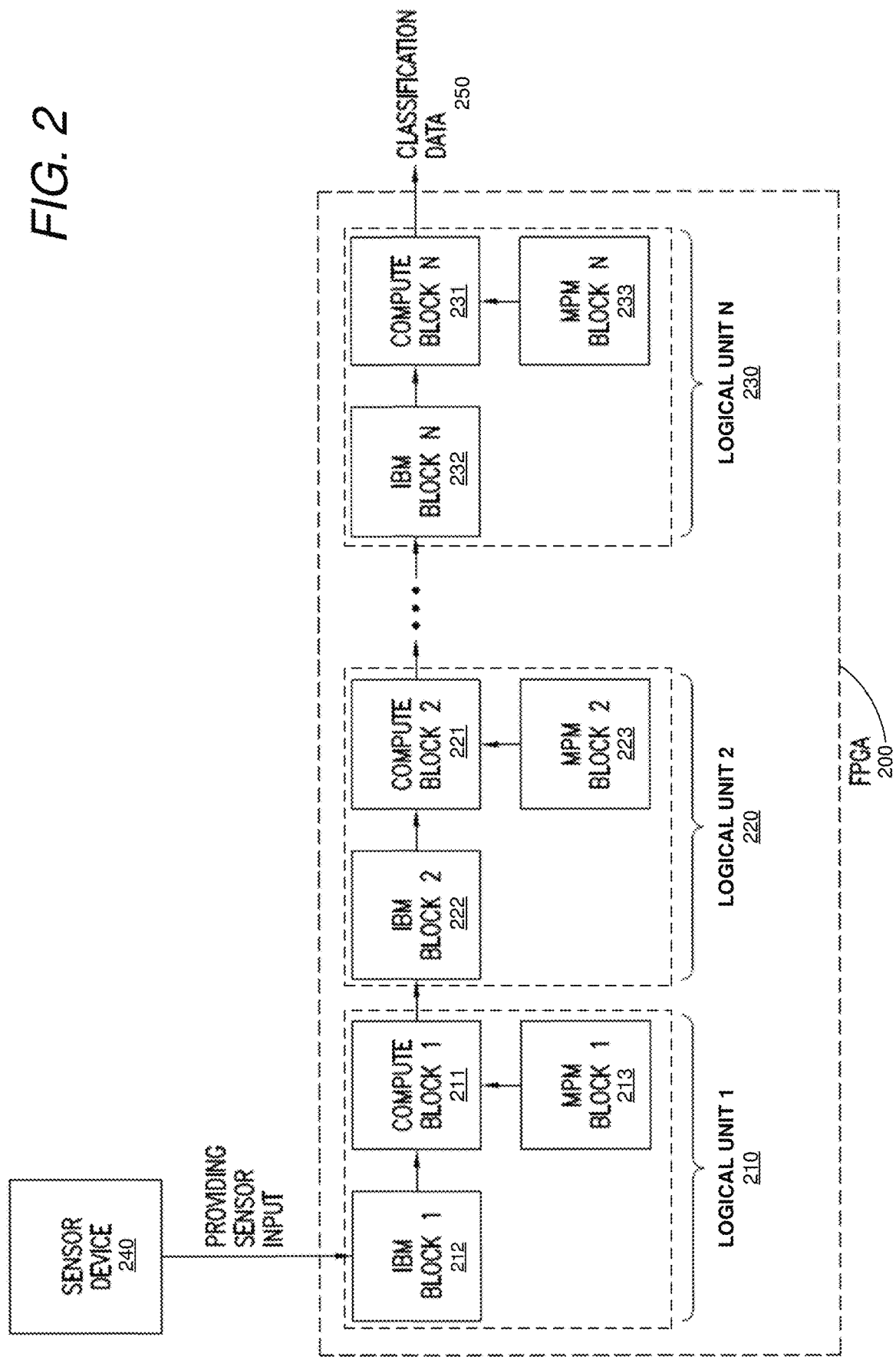
FIG. 2 illustrates an example computing device comprising a sensor device 240 and a CNN implemented on a FPGA 200.

FIG. 2 illustrates an example computing device implemented on a PLD for image processing and object recognition operations. This example device may consume substantially less power than devices implemented with a CPU or a GPU for image processing and object recognition operations. In particular embodiments, a computing device may comprise a CNN implemented on a PLD (e.g., FPGA 200). A sensor device 240 may provide sensor input data to a CNN and the CNN may process the sensor input data and provide classification data 250 (i.e., output data).

In particular embodiments, a FPGA 200 may implement a CNN. As an example and not by way of limitation, a FPGA 200 may use a plurality of logical units of various types to implement layers of a CNN, including, by way of example and not limitation: a plurality of convolutional layers, a plurality of pooling/subsampling layers, a plurality of non-linear layers, and a plurality of fully connected layers or a plurality of a combination of any of these mentioned layers.

FIG. 2 illustrates logical units of FPGA 200, each of which implement a corresponding convolutional layer of the CNN. Although the example embodiments described herein relate to convolutional layers, features of the embodiments described herein may be applied to other types of layers of a CNN, including, for example, pooling/subsampling layers, non-linear layers, and fully connected layers. This disclosure contemplates any suitable combination, arrangement, and number of layers of CNNs implemented on a PLD.

In particular embodiments, each logical unit (corresponding to a layer of the CNN) implemented on a FPGA 200 may be implemented using one or more compute blocks and one or more memory blocks associated with the one or more compute blocks. As an example and not by way of limitation, each convolutional layer of a CNN may be implemented by a logical unit comprising one compute block and at least two memory blocks dedicated to the one compute block. The at least two dedicated memory blocks may include at least one intermediate buffer memory (IBM) block and at least one model-parameter memory (MPM) block. For example, FIG. 2 illustrates logical unit 1 (210) comprising one IBM block 1 (212), one MPM block 1 (213), and one compute block 1 (211) and logical unit 2 (220) comprising one IBM block 2 (222), one MPM block 2 (223), and one compute block 2 (221). FIG. 2 further illustrates additional logical units up to, and including, logical unit N (230) comprising one IBM block N (232), one MPM block N (233), and one compute block N (231). Although FIG. 2 illustrates each of the compute blocks being associated with one IBM block and one MPM block, a compute block may be associated with more than one IBM blocks and/or more than one MPM blocks. This disclosure contemplates any suitable combination, arrangement, and number of memory blocks associated with compute blocks. As an example and not by way of limitation, fully connected layers may comprise one compute block and one IBM block. As an example and not by way of limitation, pooling/subsampling layers may comprise one compute block and one IBM block. In particular embodiments, a compute block in one logical unit may access memory blocks in another logical unit to read and/or write data; in such embodiments, a memory controller implemented on the FPGA may manage shared access to such memory blocks.

In particular embodiments, IBM blocks may serve as a buffer by storing data before the data is processed by an associated compute block. MPM blocks may store CNN parameters used by a corresponding compute block. As an example and not by way of limitation, MPM blocks may store weights used by a convolutional layer for feature extraction, which weights may be determined during a training process or updated after the training process. Compute blocks may process sensor input data and provide classification data 250 as an output.

In particular embodiments, implementation of near-memory architecture may reduce overall power consumptions of computing devices. Near-memory architecture is based on an idea that considerable amount of energy is dissipated while data travels around within devices or systems (e.g., while data travels between a memory storing the data and a computing unit processing the data). In other words, for example, by reducing the distance data has to travel, energy dissipated from data traveling around within devices or systems may be reduced, thus reducing the overall power consumption. In particular embodiments, power consumptions of the CNN may be reduced by placing one or more memory blocks in close proximity to a corresponding compute block to reduce the distance data has to travel within the CNN. As an example and not by way of limitation, FIG. 2 shows, for each compute block, a dedicated IBM block and a dedicated MPM block in proximity to the compute block: IBM block 1 (212) and MPM block 1 (213) is in proximity to compute block 1(211) and IBM block 2 (222) and MPM block 2 (223) is in proximity to compute block 2 (221).

In particular embodiments, power consumption of computing devices may be reduced by structuring data in memory blocks in consecutive addresses corresponding to the order the data is accessed. As an example and not by way of limitation, parameters in MPM blocks (e.g., weights or filters) may be written in consecutive addresses in the order they are accessed by compute blocks. This lets the compute block to fetch multiple data elements by accessing the memory less while increasing the bit-width of each read. For example, if each data element is 8-bit and we want to access 4 data elements, we can access the memory once and read a 32-bit data element which provides all of the required data whereas reading 4 8-bit width data elements if they are not adjacent in the memory. Managing the manner in which parameters are stored within MPM blocks in order to reduce the distance data has to travel within a CNN may reduce the overall power consumption of computing devices. This disclosure contemplates restructuring of any data stored on any memory, including IBM blocks, MPM blocks, and external memories, in the order they are accessed, or any other arrangement, to minimize the overall distance data has to travel.

In particular embodiments, power consumption of computing devices may be reduced by parallel computation of layers of a CNN. The architecture of PLDs may allow each layer of the CNN to compute simultaneously and concurrently with other layers. The parallel computation of layers may enable the computing devices to operate in a more efficient way with respect to the power consumption of the devices. As an example and not by way of limitation, in FIG. 2, once compute block 1 (211) of logical unit 1 (210) finishes computing a first set of sensor input data, the first set of data may be outputted to IBM block 2 (222) of logical unit 2 (220), then compute block 1 (211) may start computing a second set of sensor input data while compute block 2 (221) simultaneously starts computing the first set of data that was processed by compute block 1 (211) (after receiving the first set of data from IBM block 2 (222)). Similarly, once compute block 2 (221) finishes computing the first set of data and outputs the data to the next logical unit, a compute block of the next logical unit may start computing the first set of data while compute block 2 (221) simultaneously starts computing the second set of data. This process may be repeatable until all layers of the CNN are simultaneously and concurrently performing computations.

This disclosure contemplates computing devices made from any suitable materials. As an example and not by way of limitation, devices may be made from bio-degradable materials or materials that are non-toxic to an environment.

Figure 3:
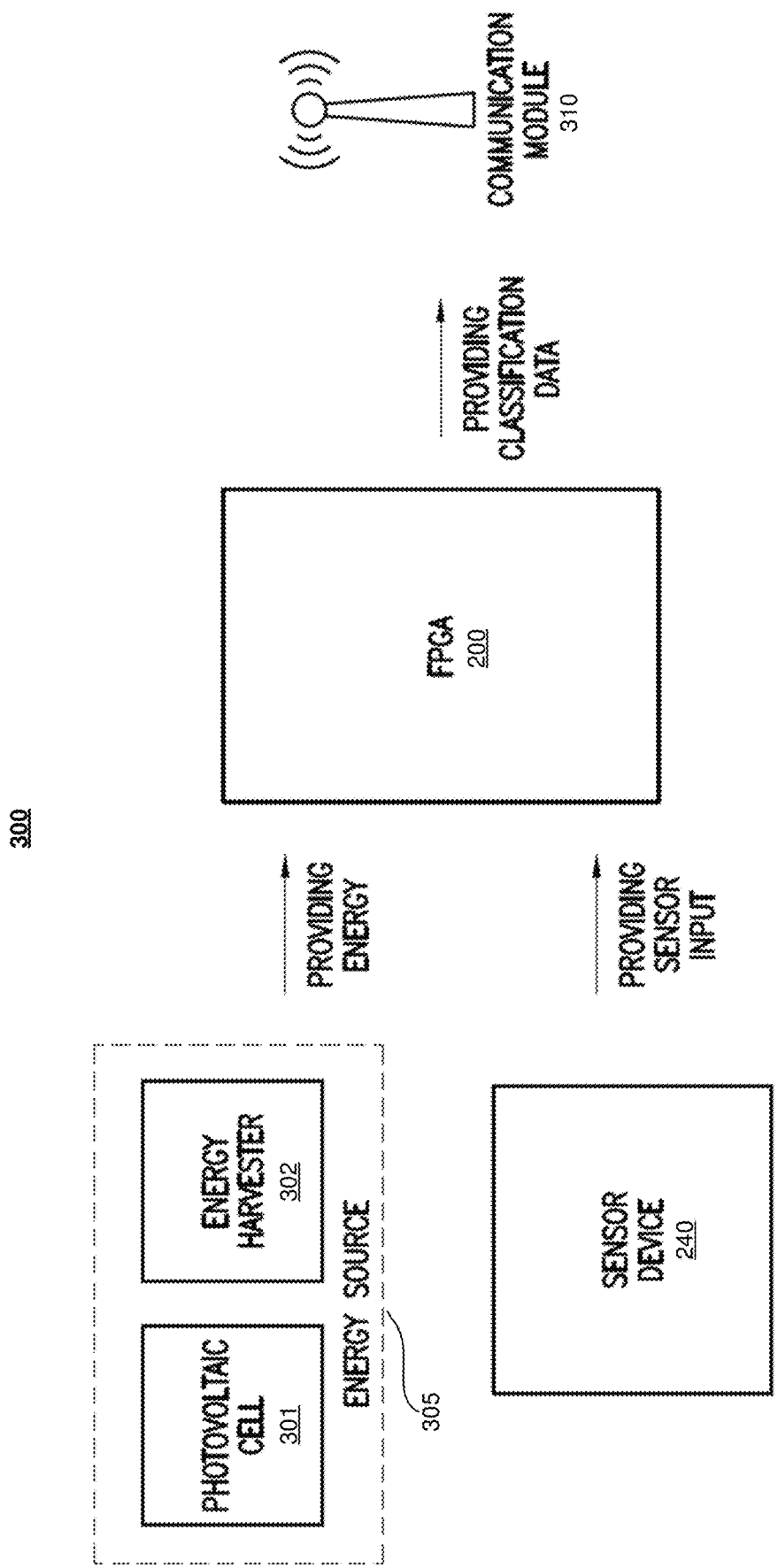
FIG. 3 illustrates an example microsystem comprising an energy source 305, sensor device 240, FPGA 200, and communication module 310.

FIG. 3 illustrates an example microsystem 300 for image processing and object recognition operations. These microsystems may consume substantially less power than systems for image processing and object recognition operations based on a CPU or a GPU. In particular embodiments, the microsystem 300 may comprise a sensor device 240, a processing unit (i.e., a CNN implemented on a FPGA 200), an energy source 305, and a communication module 310.

In particular embodiments an energy source 305 may comprise an energy generator and an energy harvester 302. An energy generator may comprise a photovoltaic cell 301.

This disclosure contemplates any size of a photovoltaic cell 301 that is suitable to generate sufficient power to operate a microsystem based on a CNN implemented a FPGA 200. Based on an energy need of the microsystem, a smaller or larger photovoltaic cell may be used. As an example and not by way of limitation, an energy source may comprise a photovoltaic cell 301 with a surface area of one square inch, which may generate approximately 30 mW (i.e., 30 mJ per second) with direct sunlight or approximately 1-10 mW with indoor light. In particular embodiments, the energy source may comprise other suitable energy sources, such as, by way of example and not limitation: electromagnetic energy sources, piezoelectric energy sources, and thermal energy sources. In particular embodiments, an energy source 305 may comprise an energy harvester 302 without an energy generator.

This disclosure contemplates any suitable energy generators. In particular embodiments, energy may be generated by piezoelectric components, generated by thermoelectric generators, harvested from ambient electromagnetic energy, harvested from kinetic energy of wind, harvested from kinetic energy of waves, or generated/harvested/scavenged from any other sources of energy found in an environment.

In particular embodiments, an energy harvester 302 may store energy generated by an energy generator and the stored energy may be used to supply energy (i.e., input power) to a microsystem. As an example and not by way of limitation, an energy harvester 302 may comprise a DC-DC converter and a supercapacitor. A supercapacitor may be used to store and supply energy to a microsystem. The rate at which a supercapacitor charges and discharges (i.e., duty cycle) may be a function of energy generated by an energy generator. As an example not by way of limitation, higher the supply power from an energy generator (e.g., a photovoltaic cell), the faster a supercapacitor may charge and discharge. In particular embodiments, a supercapacitor may supply energy to a microsystem when its voltage is equal to or exceeds a $V_{max}$ threshold and may stop providing energy to the microsystem when its voltage reduces below a $V_{min}$ threshold. In particular embodiments, a DC-DC converter may be capable of changing the output condition of a supercapacitor. As an example and not by way of limitation, a DC-DC converter may enable a supercapacitor to discharge a constant voltage, constant current, constant power, or any other discharge operations suitable to operate a microsystem based on a CNN implemented a FPGA 200. In particular embodiments, an energy harvester 302 may comprise a battery.

In particular embodiments, an input sensor 240 may provide input data to a processing unit. As an example and not by way of limitation, an input sensor may be an audio microphone. As an example and not by way of limitation, an input sensor 240 may be a low-power camera capable of capturing images or video frames. This disclosure contemplates any input sensor(s) 240 that is capable of providing sensor data suitable for a CNN inference engine. In particular embodiments, size of input data may be reduced based on supply power available from an energy source 305. As an example and not by way of limitation, size of input data may be reduced when there is a low amount of power available from an energy source by reducing sampling rates of images or video frames. As an example and not by way of limitation, size of input data may be reduced by reducing resolutions of images or video frames.

In particular embodiments, a communication module 310 may transmit data or receive data to and from external devices or systems. As an example and not by way of limitation, a communication module may be a Bluetooth device, a Wi-Fi device, any low-power wide-area network (LPWAN) protocol such as LoRa or any other suitable devices suitable for communicating with external devices or systems. In particular embodiments, a communication module 310 may include multiple communication devices, which devices are selected for communicating based on amount of energy supplied by an energy source. In particular embodiments, a communication module 310 may be part of a mesh network (e.g., ad hoc network), communicating with external devices or systems with or without a connection to an external telecommunication network. In particular embodiments, a communication module 310 may receive updates from external devices or systems. As an example and not by way of limitation, a communication module 310 may receive over-the-air (OTA) updates to model-parameters for particular MPM blocks, modify the network architecture, or updates to initializing configurations of a FPGA 200.

In particular embodiments, microsystem 300 may comprise an external memory connected to FPGA 200. The external memory may store output data comprising classification data 250. As an example and not by way of limitation, classification data 250 provided as an output data may be stored on an external memory for future transmission. As an example and not by way of limitation, classification data may be batched for future transmission.

In particular embodiments, the external memory may store configuration data for FPGA 200. In particular embodiments, when FPGA 200 is initially booted up or restarted, it may retrieve configuration data from the external memory. The configuration data may include routing information for blocks on FPGA 200, as well as other information to be loaded into memory blocks in the logical units, such as model parameters. After boot-up, the external memory component may be detached until the next restart event.

Traditional CNNs implemented on a CPU or a GPU may require hundreds of mJ per inference, wherein a single inference may be a clip of an audio recording, a video frame, or an image frame. In particular embodiments, a CNN implemented on a FPGA 200 may require substantially less energy than a CNN implemented on a CPU or a GPU. As an example and not by way of limitation, a CNN implemented on a FPGA 200 may require around 2 mJ per inference. As discussed above, this reduction in energy consumption may be attributed to, for example, parallel computation of inferences and implementation of near-memory architecture.

This disclosure contemplates CNN inference engines implemented on any suitable PLDs. In particular embodiments, implementing a CNN inference engine on a PLD may require the CNN inference engine to be re-trained on a PLD-based microsystem if the inference engine was previously trained on a CPU-based system or GPU-based system. As an example and not by way of limitation, a CNN inference engine implemented on a FPGA 200 may need to be re-trained on a FPGA-based microsystem if the CNN inference engine was previously trained on a CPU or a GPU-based system.

In particular embodiments, the CNN inference engine implemented on a FPGA 200 may be used to accelerate a CPU- and/or GPU-based system. Components of the CNN inference engine running on the CPU and/or GPU that consume a lot of energy and/or time from the CPU and/or GPU may be offloaded embodiments described herein. For example, in a 30-layer CNN, if layers 10-20 consume the most energy from the CPU, a CNN implemented on an FPGA as described herein (with or without input sensor)

may obtain the input to layer 10 from the CPU/GPU and returns the output of layer 20 to the CPU/GPU. In this manner, the underlying CPU- and/or GPU-based system may become more efficient in terms of energy and/or speed.

In particular embodiments, after deployment of the microsystem, it may be possible to refine the final classification provided by the CNN inference engine based on individualized context information to be used as benchmark input data. One or more signatures may be generated by the CNN inference engine based on the benchmark input data, then stored in a final layer of the CNN for comparison in real-time against signatures generated for subsequent input data. For example, a microsystem may be deployed in a location to capture images for performing bio-authentication (e.g., faces, irises, palm prints, fingerprints) of humans prior to entry into a secured area. The microsystem may be provided with benchmark images for a set of authorized individuals by capturing those images using sensor device 240 (e.g., a camera). The signatures generated by the CNN inference engine for those benchmark images may be stored in the external memory and then, upon boot-up of FPGA 200, loaded into a MPM block accessible by a final layer of the CNN for comparison. Subsequently, during normal execution, when the CNN receives an image from sensor device 240, in the final stage of processing, the CNN can compare a signature generated for the image against the signatures for the benchmark images.

Figure 4:
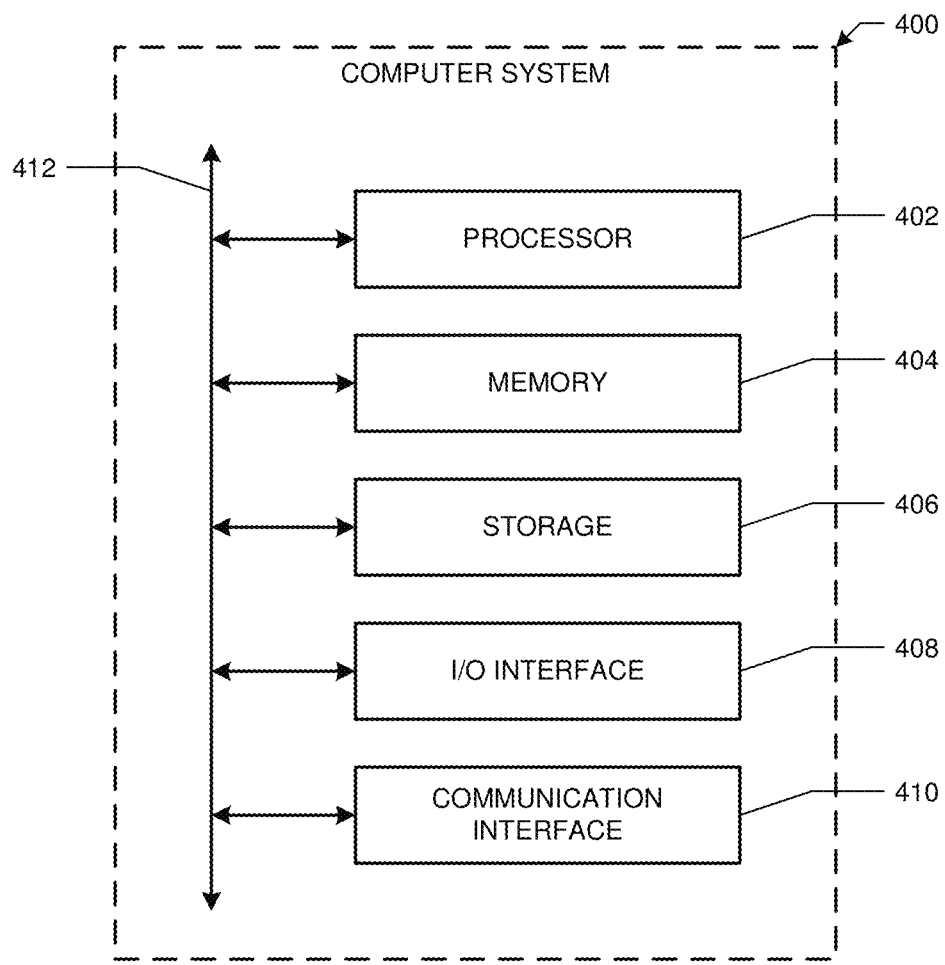
FIG. 4 illustrates an example computer system 400.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a PLD (e.g., PLA, PAL, GAL, CPLD, or FPGA), an ASIC (e.g., a SoC), a single-board computer system (SBC) (such as, for example, a computer-on-module (COM) or system-on-module (SOM)), a mesh of computer systems, a mobile telephone, a personal digital assistant (PDA), a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 may include a processor 402, memory 404, storage 406, an input/output (I/O) interface 408, a communication interface 410, and/or a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, PLDs or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, flash memory-based storage, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computing device comprising:
 a programmable logic device (PLD) implementing a convolutional neural network (CNN), wherein:
  each of a plurality of logical units of the PLD corresponds to one of a plurality of layers of the CNN; and
  at least one of the logical units corresponds to a convolutional layer of the plurality of layers and comprises a compute block and at least two memory blocks, wherein:
   the compute block is positioned in the PLD in proximity to the at least two memory blocks relative to at least one other memory block of the PLD;
   a first one of the at least two memory blocks serves as a buffer for the convolutional layer; and
   a second one of the at least two memory blocks stores model-specific parameters for the convolutional layer.

2. The computing device of claim 1, wherein data in the second memory block is written into locations in the second memory block at consecutive addresses.

3. The computing device of claim 1, wherein the model-specific parameters comprise weights or filters for the convolutional layer.

4. The computing device of claim 1, further comprising a communication module for receiving over-the-air (OTA) updates for parameter configurations or transmitting an output data.

5. The computing device of claim 4, wherein the output data comprises classification data corresponding to an input data.

6. The computing device of claim 4, wherein the communication module communicates with other devices within a wireless network.

7. The computing device of claim 4, wherein the communication module comprises at least two wireless transmitters, and wherein one of the at least two wireless transmitters is selected to be used for receiving the updates or transmitting the output data based on a supply power available from an energy source.

8. The computing device of claim 4, wherein the output data is batched for transmission.

9. The computing device of claim 5, further comprising an external memory to store the output data comprising classification data corresponding to the input data.

10. The computing device of claim 1, wherein the computing device is made from a bio-degradable material.

11. The computing device of claim 1, further comprising a camera used for capturing images or video frames, a microphone to capture audio signals, or any other sensor device.

12. The computing device of claim 1, wherein input data is reduced, based on a supply power available from an energy source:
 by reducing a sampling rate of the input data; or
 by reducing a resolution at which the input data is captured.

13. The computing device of claim 1, wherein the compute block in at least one of the logical units accesses at least one shared memory block in at least one other logical unit to read or write data.

14. The computing device of claim 13, further comprising a memory controller implemented on the PLD, wherein the memory controller manages shared access to the at least one shared memory block.

15. The computing device of claim 1, wherein the at least two memory blocks comprise dedicated on-chip memory blocks.

16. A system, comprising:
 an input sensor providing input data;
 an energy source for supplying power to the system;
 a communication module; and
 a programmable logic device (PLD) implementing a convolutional neural network (CNN), wherein:
  each of a plurality of logical units of the PLD corresponds to one of a plurality of layers of the CNN; and
  at least one of the logical units corresponds to a convolutional layer of the plurality of layers and comprises a compute block and at least two memory blocks, wherein:
   the compute block is positioned in the PLD in proximity to the at least two memory blocks relative to at least one other memory block of the PLD;
   a first one of the at least two memory blocks serves as a buffer for the convolutional layer; and
   a second one of the at least two memory blocks stores model-specific parameters for the convolutional layer.

17. The system of claim 16, wherein the communication module comprises at least two wireless transmitters, and wherein one of the at least two wireless transmitters is selected to be used for receiving the updates or transmitting an output data based on a supply power available from the energy source.

18. The system of claim 17, further comprising an external memory to store the output data.

19. The system of claim 17, wherein the output data is batched for transmission.

20. The system of claim 16, wherein the power supplied by the energy source corresponds to a duty cycle of the energy source, and wherein the duty cycle is a rate at which the energy source charges and discharges.

21. A method for processing a computing device, comprising:
- initializing a programmable logic device (PLD) with an initializing configuration for a convolutional neural network (CNN);
- receiving input data;
- processing, by a plurality of logical units of the PLD, the input data, wherein each of a plurality of logical units of the PLD corresponds to one of a plurality of layers of the CNN; and
- wherein at least one of the logical units corresponds to a convolutional layer of the plurality of layers and comprises a compute block and at least two memory blocks, wherein the compute block is positioned in the PLD in proximity to the at least two memory blocks relative to at least one other memory block of the PLD, a first one of the at least two memory blocks serves as a buffer for the convolutional layer, and a second one of the at least two memory blocks stores model-specific parameters for the convolutional layer; and
- transmitting an output data.

* * * * *